United States Patent
Radhakrishnan et al.

(10) Patent No.: US 7,404,057 B2
(45) Date of Patent: Jul. 22, 2008

(54) SYSTEM AND METHOD FOR ENHANCING READ PERFORMANCE OF A MEMORY STORAGE SYSTEM INCLUDING FULLY BUFFERED DUAL IN-LINE MEMORY MODULES

(75) Inventors: Ramesh Radhakrishnan, Austin, TX (US); James Pankratz, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 192 days.

(21) Appl. No.: 11/167,037

(22) Filed: Jun. 24, 2005

(65) Prior Publication Data
US 2007/0016718 A1 Jan. 18, 2007

(51) Int. Cl.
G06F 12/16 (2006.01)
G06F 13/00 (2006.01)

(52) U.S. Cl. .......................... 711/167; 711/165; 711/5; 714/5; 714/6

(58) Field of Classification Search ...................... 711/5, 711/161; 714/720
See application file for complete search history.

(56) References Cited

U.S. PATENT DOCUMENTS

| | | | | |
|---|---|---|---|---|
| 5,699,509 A * | 12/1997 | Gary et al. | ..................... | 714/54 |
| 6,502,161 B1 * | 12/2002 | Perego et al. | .................. | 711/5 |
| 6,732,243 B2 * | 5/2004 | Busser et al. | ............... | 711/162 |
| 7,143,207 B2 * | 11/2006 | Vogt | ............................. | 710/31 |
| 2005/0138267 A1 * | 6/2005 | Bains et al. | ................. | 711/100 |
| 2006/0083043 A1 * | 4/2006 | Cypher | ........................ | 365/51 |
| 2006/0111866 A1 * | 5/2006 | LeClerg et al. | .............. | 702/130 |
| 2006/0288177 A1 * | 12/2006 | Shaw | ......................... | 711/162 |

* cited by examiner

*Primary Examiner*—Gary J Portka
*Assistant Examiner*—Kaushikkumar Patel
(74) *Attorney, Agent, or Firm*—Baker Botts L.L.P.

(57) ABSTRACT

A system and method for enhanced read performance of a memory storage system is disclosed. The storage system includes a first memory controller. At least one first channel of a plurality of memory modules couples to the first memory controller. At least one memory module in the at least one first channel can return data sought in a read request, if present, to the first memory controller without sending the data through each memory module in the at least one first channel. The storage system also includes a second memory controller coupled to at least one second channel of a plurality of memory modules. At least one memory module in the at least one second channel can return data sought in a read request, if present, to the second memory controller without sending the data through each memory module in the at least one second channel. The at least one second channel contains an inverse mirror copy of data stored on the first channel.

20 Claims, 3 Drawing Sheets

SYSTEM AND METHOD FOR ENHANCING READ PERFORMANCE OF A MEMORY STORAGE SYSTEM INCLUDING FULLY BUFFERED DUAL IN-LINE MEMORY MODULES

TECHNICAL FIELD

The present disclosure relates generally to computer systems and information handling systems, and, more specifically, to a system and method for enhancing read performance of a computer system including fully buffered dual in-line memory modules.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include a memory storage system or storage network that includes dual in-line memory modules, or "DIMMs." A DIMM is a form of random-access-memory integrated circuit. Many information handling systems employ bi-directional, parallel channel designs for systems of DIMMs. Parallel channel DIMM systems, however, sometimes cannot provide the increased memory capacity required by increasingly fast new processors and improved input/output ("I/O") subsystem performance. One cost-efficient solution to this problem may be serialized DIMM systems that include fully buffered DIMMs, or "FB-DIMMs." FB-DIMM systems may be especially useful for high-end information handling systems, such as workstations and server platforms, to enable scaling of both bandwidth and density.

Although FB-DIMM systems allow for cost-efficient high-capacity memory systems, such systems may suffer an increased risk of system failure because the potential for multi-bit errors increases as memory capacity increases. As a result, FB-DIMM systems may utilize memory mirroring techniques, similar to a redundant array of independent disks ("RAID"), to guard against information loss in the case of a system failure. RAID storage systems combine multiple storage units into an array to obtain performance, capacity, and reliability advantages over other storage techniques, including, for example, using a single large storage device. In FB-DIMM systems using RAID storage techniques, multiple memory controllers simultaneously send read requests for information from a host through multiple channels of serialized FB-DIMMs that contain directly mirrored data. The host compares the data resulting from the requests to the different channels; inconsistencies between data read from the different channels indicate failures in the FB-DIMM system that should be investigated. Because the FB-DIMM system stores a directly mirrored set of the data, however, the likelihood that the data will be irretrievably lost in the case of a system failure is reduced.

Although such a directly mirrored FB-DIMM systems offer greater fault tolerance than non-mirrored systems, the availability of the directly mirror data set does not reduce read latencies caused by the serial architecture used with FB-DIMM systems. Read latencies result from "round-trip delays" that data requests experience as they travel through a channel: in a serial FB-DIMM system, the memory controllers must wait until the data request has traveled to each FB-DIMM in serial fashion and then return to the memory controller through each FB-DIMM, even if the requested information is available in the first FB-DIMM unit in the system. For directly mirrored FB-DIMM systems, a read request must travel to and from each FB-DIMM in the channel containing the original data, while substantially simultaneously traveling to and from each FB-DIMM in the channel containing the mirror data set. The resulting round-trip delays slow the operation of the FB-DIMM system.

SUMMARY

In accordance with the present disclosure, a system and method for enhanced read performance of a memory storage system is disclosed. The storage system includes a first memory controller with at least one first channel of a plurality of memory modules coupled to the first memory controller. At least one memory module in the at least one first channel can return data sought in a read request, if present, to the first memory controller without sending the data through each memory module in the at least one first channel. The storage system also includes a second memory controller. At least one second channel of a plurality of memory modules couples to the second memory controller. At least one memory module in the at least one second channel can return data sought in a read request, if present, to the second memory controller without sending the data through each memory module in the at least one second channel. The at least one second channel contains an inverse mirror copy of data stored on the first channel.

The system transmits a read request substantially simultaneously from the first memory controller to a first memory module in the at least one first channel and from the second memory controller to a first memory module in the at least one second channel. The first memory modules determine whether information sought by the read request is available in that memory module. If the information is found in a first memory module, the first memory module returns the information to the memory controller without sending the information to the second memory module in that channel. If the information is not found in the first memory module in a channel, the first memory module sends the read request to the second memory module in the channel.

The system and method disclosed herein is technically advantageous because it reduces the time needed to return information stored in the channels of memory modules to the memory controllers, thereby enhancing read performance in the storage system. Because the at least one second channel of memory modules contains an inverse mirror copy of the data in the at least one first channel of memory modules, the storage system can always locate at least one copy of any information in the storage system within the half of the memory modules nearest the memory controllers. The storage system can therefore obtain at least a preliminary answer to its read request in less time than a full round trip for a read request through each memory module in a channel would take. The storage system may compare the data once the data becomes available from the second memory controller. If the storage system finds a discrepancy between the data returned by the two memory controllers, the preliminary data sent out from the first available memory module may be cancelled.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory ("RAM"), one or more processing resources such as a central processing unit ("CPU") or hardware or software control logic, ROM, and/or other types of nonvolatile memory. Additional components of the information handling system may include one or more disk drives, one or more network ports for communication with external devices as well as various input and output ("I/O") devices, such as a keyboard, a mouse, and a video display. The information handling system may also include one or more buses operable to transmit communications between the various hardware components.

Figure 1:
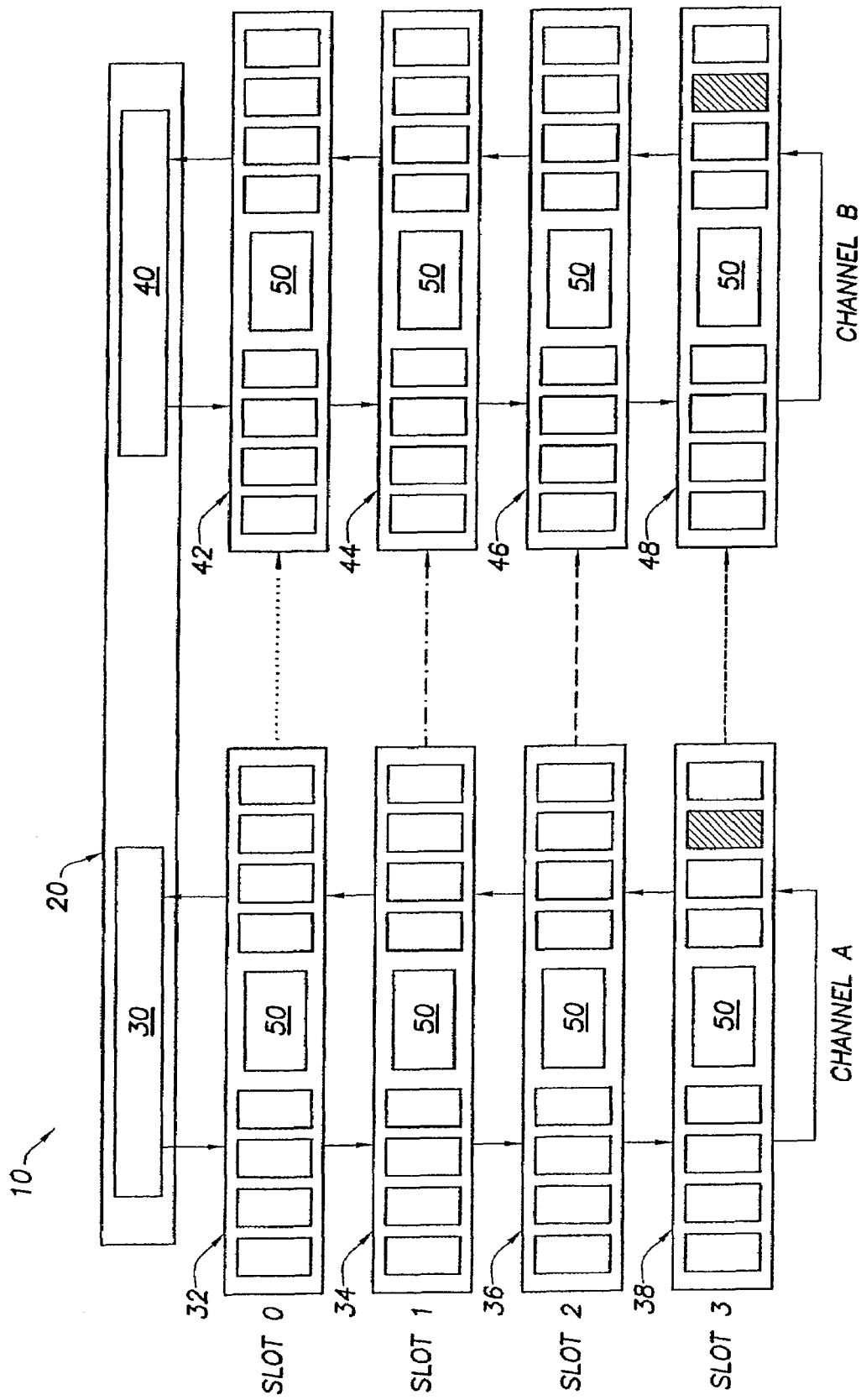
FIG. 1 is a block diagram of hardware and software elements of a computer system using fully buffered dual in-line memory modules.

FIG. 1 illustrates an example storage system 10 that includes a host 20, a first memory controller 30 and a second memory controller 40. Storage system 10 may include additional pairs of memory controllers, as needed; FIG. 1, however, illustrates only two memory controllers for simplicity. First memory controller 30 and second memory controller 40 each have a single channel of memory modules, which are labeled "Channel A" and "Channel B," respectively, in FIG. 1. Channel A and Channel B each include four slots, labeled "Slot 0," "Slot 1," "Slot 2," and "Slot 3" in FIG. 1. Again, however, each memory controller may have multiple channels, and each channel may include any number of slots. For simplicity, FIG. 1 illustrates only one channel per memory controller and only four slots per channel. Each slot contains a memory module, which may be a FB-DIMM. Thus, in Channel A of FIG. 1, Slot 0 contains a first FB-DIMM 32, Slot 1 contains a second FB-DIMM 34, Slot 2 contains a third FB-DIMM 36, and Slot 3 contains a fourth FB-DIMM 38. Likewise, for Channel B, Slot 0 includes a first FB-DIMM 42, Slot 1 includes a second FB-DIMM 44, Slot 2 includes a third FB-DIMM 46, and Slot 3 includes a fourth FB-DIMM 48.

Each FB-DIMM in storage system 10 includes an advanced-memory buffer ("AMB") 50. Each AMB 50 has a serial link for upstream data transfer and a serial link for downstream data transfer to the nearest element in storage system 10. For example, AMB 50 in first FB-DIMM 32 can pass data to or receive data from memory controller 30 via its upstream serial link and pass data to or receive data from second FB-DIMM 34 via its downstream serial link, and so on. The AMBs 50 write to and read data from their respective FB-DIMMs upon receiving requests from memory controllers 30 or 40.

The data held in the FB-DIMMs of Channel A is directly mirrored in the FB-DIMMs of Channel B in a configuration commonly referred to as a "RAID Level 1" system. That is, a duplicate of the data residing in first FB-DIMM 32 of Channel A resides in first FB-DIMM 42 of Channel B, a duplicate of the data residing in second FB-DIMM 34 of Channel A resides in second FB-DIMM 44 of Channel B, and so on, as indicated by the dotted and dashed arrows in the center of FIG. 1. This data configuration provides a high level of fault tolerance, as the data is completely redundant within storage system 10. Thus this data configuration may be useful for large-capacity storage systems.

When performing a read operation, host 20 simultaneously sends the request to both first memory controller 30 and second memory controller 40. Each memory controller then passes the read request to the FB-DIMMs in its respective channel in succession. Ordinarily, any read request must make a complete "round trip," passing through each FB-DIMM in succession and then returning through each FB-DIMM in succession, because of the serial architecture of storage system 10. The solid arrows in FIG. 1 between each FB-DIMM illustrate the round-trip path of the read request. A read request must make this round trip even if the requested data is available in the FB-DIMM closest to the memory controllers, such as first FB-DIMM 32 and first FB-DIMM 42. Because the data in storage system 10 (as depicted in FIG. 1) is directly mirrored across the slots in Channel A and Channel B, first memory controller 30 and second memory controller 40 will obtain the requested data in their respective channels at approximately the same time. That is, first memory controller 30 will receive the requested data from fourth FB-DIMM 38, represented by the shaded area in FIG. 1, at approximately the same time that second memory controller 40 receives the requested data, also indicated by shading, from fourth FB-DIMM 48. The data read latency is thus about the same for each memory controller, and, in this example, host 20 has no choice but to wait until the data returns from Slot 3. Once host 20 receives the data from both memory controllers, it can compare the information to determine whether the data is intact or corrupted.

Figure 2:
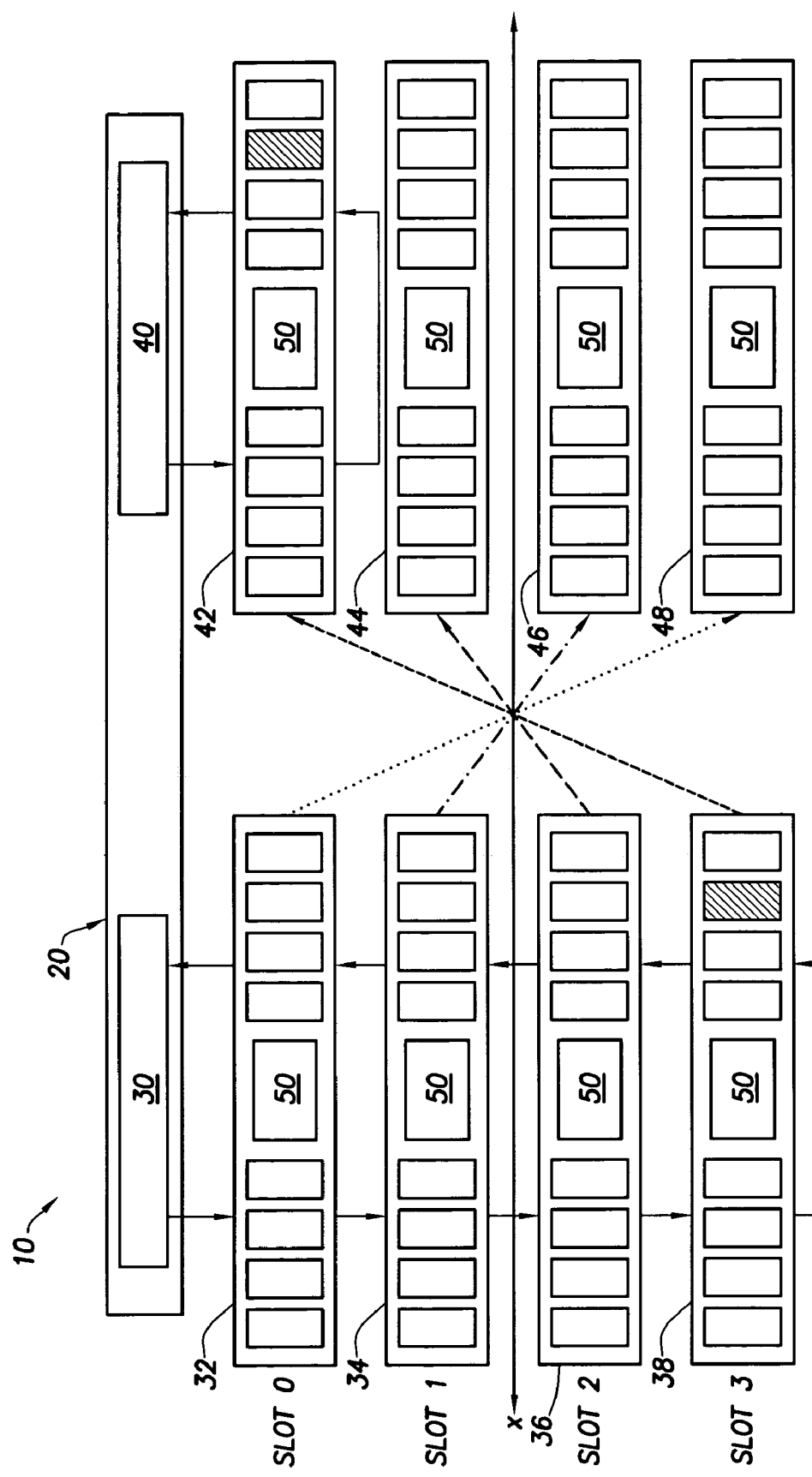
FIG. 2 is a block diagram of hardware and software elements of a computer system using fully buffered dual in-line memory modules.

FIG. 2 illustrates an example storage system 10 that may enhance read performance by reducing data read latency. To achieve this enhanced performance, the user of storage system 10 must activate an optional feature available for certain FB-DIMMs called "Variable Read Latency," or "VRL." Activating the VRL feature allows the AMB 50 in an individual FB-DIMM to determine whether that FB-DIMM contains the data sought in the read request. If that FB-DIMM contains the requested data, AMB 50 will send the data along the return path back to the accompanying memory controller, without passing the data on to the next downstream FB-DIMM in the channel. If the FB-DIMM does not contain the requested data, AMB 50 will pass the read request on to the next downstream FB-DIMM. Thus, if the data sought is located in first FB-DIMM 42, which is the closest FB-DIMM to memory controller 40, the AMB 50 in first FB-DIMM 42 can return the data to memory controller 40 without passing it on to the second, third and fourth FB-DIMMs in Channel B.

In addition, the data in storage system 10 is mapped in an inverse mirror configuration between Channel A and Channel B, as indicated by the dotted and dashed arrows in FIG. 2. That is, a duplicate set of the data residing in first FB-DIMM 32 resides in fourth FB-DIMM 48. A duplicate set of the data residing in second FB-DIMM 34 resides in third FB-DIMM 46. A duplicate set of the data residing in third FB-DIMM 36 resides in second FB-DIMM 44. Finally, a duplicate set of the data residing in fourth FB-DIMM 38 resides in first FB-DIMM 42. Therefore, a copy of all of the unique data available in Channels A and B resides in the half of storage system 10 closest to memory controllers 30 and 40, or above axis "x" in shown in FIG. 2. A complete mirror image of this unique data set is available in the bottom half of storage system 10, below axis x.

The end result of these changes to storage system 10 may be enhanced read performance. Host 20 sends a read request to memory controller 30 and memory controller 40, as indicated by the solid arrows in FIG. 2. Memory controller 30 passes the read request to first FB-DIMM 32, and memory controller 40 passes the read request to first FB-DIMM 42. In the example process shown in FIG. 2, the requested data is located in first FB-DIMM 42. Because the VRL feature in first FB-DIMM 42 is activated, the AMB 50 in FB-DIMM 42 sends the information directly back to memory controller 40, without passing the request on to second FB-DIMM 44. Memory controller 40 passes the requested information on to host 20. The return path for the requested data is therefore shortened dramatically. Meanwhile, the read request travels through Channel A to fourth FB-DIMM 38, where the mirror image of the requested data resides. Fourth FB-DIMM 38 sends the data back through the chain of FB-DIMMs in Channel A to memory controller 30, which then passes the data back to host 20. As with the storage system 10 shown in FIG. 1, host 20 compares the data received from memory controller 30 to the data received from memory controller 40. If the data does not match exactly, host 20 will kill the read request, and possibly corrupted data can be investigated.

Figure 3:
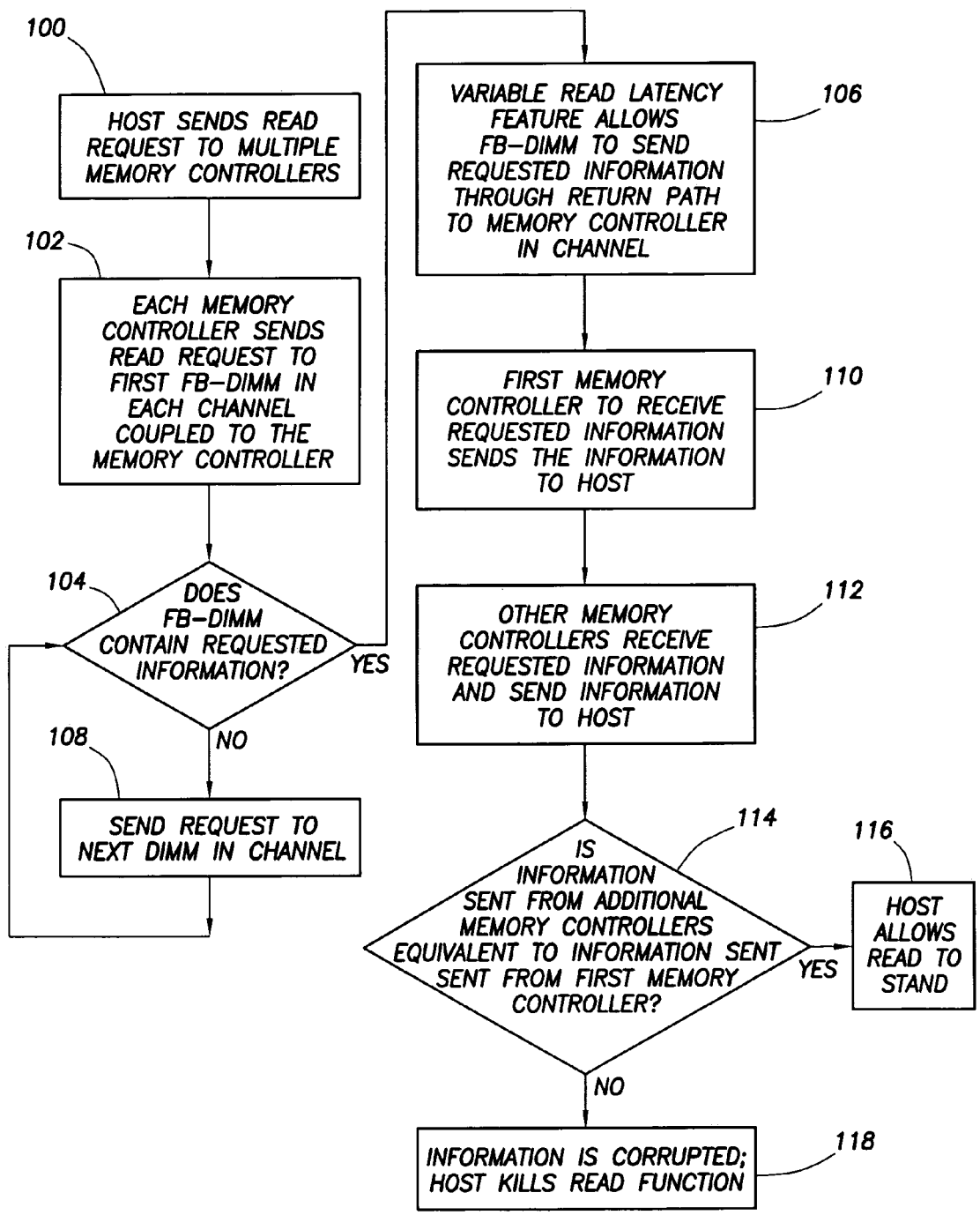
FIG. 3 is flow diagram of a method for enhanced read performance of a computer system using fully buffered dual in-line memory modules.

FIG. 3 presents a flow diagram of an example enhanced read performance process for a storage system 10 including FB-DIMMs. In block 100, the host sends a data read request to all memory controllers to which the host is coupled. In block 102, each memory controller sends the read request to the first FB-DIMM in each channel to which the memory controller is coupled. The AMB in the first FB-DIMM decides whether the first FB-DIMM contains the requested data in block 104. If the first FB-DIMM contains the requested data, the AMB sends that information on the return path back to the memory controller coupled to the channel, as shown in block 106. If the first FB-DIMM does not contain the requested data, the FB-DIMM sends the read request to the next FB-DIMM in the channel, as shown in block 108. The AMB in this next FB-DIMM repeats the process of determining whether this next FB-DIMM contains the requested data shown in block 104, and either sends the data on the return path back to the memory controller for the channel or passes the unsatisfied read request on to the next downstream FB-DIMM. In block 110, the first memory controller to receive the requested data passes the data to the host.

Later, other memory controllers will receive the requested data, as shown in block 112. These memory controllers will pass the data on to the host, which then must make the decision shown in block 114: is the information sent from the additional memory controller(s) equivalent to information sent from the first memory controller? If the information is equivalent, the process is complete, and the host allows the read to stand, as indicated in block 116. If the information is not equivalent, the information is corrupted, and the host will kill the read request, as shown in block 118. The host can then take the appropriate steps to remedy the system failure.

Not every FB-DIMM in a channel need have the VRL capabilities. That is, the FB-DIMM farthest from the memory controller, such as fourth FB-DIMM 38 and fourth FB-DIMM 48, need not be able to use VRL: once the read request reaches the final FB-DIMM in a given channel, data returned from that FB-DIMM will make a full round trip through the channel and no time-savings will arise from the use of VRL. Therefore, should eliminating VRL capability from the final FB-DIMM in the channel offer cost-savings, a non-VRL-equipped FB-DIMM may be substituted. Although the present disclosure has been described in detail, various changes, substitutions, and alterations can be made hereto without departing from the spirit and scope of the invention as defined by the appended claims.

What is claimed is:

1. A memory storage system, wherein the memory storage system comprises:
   a first memory controller,
   a first channel of a plurality of memory modules coupled to the first memory controller, wherein at least one memory module in the first channel can return data sought in a read request, if the data is present, to the first memory controller without sending the data through each memory module downstream in the at least one first channel,
   a second memory controller, and
   a second channel of a plurality of memory modules coupled to the second memory controller, wherein at least one memory module in the second channel can return data sought in the read request, if the data is present, to the second memory controller without sending the data through each memory module downstream in the second channel, and wherein the second channel contains an inverse mirror copy of data stored on the first channel.

2. The memory storage system of claim 1, wherein each memory module in the first channel can return data sought in the read request, if the data is present, to the first memory controller without sending the data through each memory module downstream in the first channel.

3. The memory storage system of claim 1, wherein each memory module in the second channel can return data sought in the read request, if the data is present, to the second memory controller without sending the data through each memory module downstream in the second channel.

4. The memory storage system of claim 1, wherein each memory module in the first channel, except the memory module in the first channel farthest from the first memory controller, can return data sought in the read request, if the data is present, to the first memory controller without sending the data through each memory module downstream in the first channel.

5. The memory storage system of claim 1, wherein each memory module in the second channel, except the memory module in the second channel farthest from the second memory controller, can return data sought in the read request, if the data is present, to the second memory controller without sending the data through each memory module downstream in the second channel.

6. The memory storage system of claim 1, wherein each memory module can return data sought in the read request, if the data is present, to a memory controller without sending the data through each memory module downstream in the channel containing the memory module.

7. The memory storage system of claim 1, further comprising:
   a third memory controller,
   a third channel of a plurality of memory modules coupled to the third memory controller, wherein at least one memory module in the third channel can return data sought in the read request, if the data is present, to the third memory controller without sending the data through each memory module downstream in the third channel,
   a fourth memory controller,
   fourth channel of a plurality of memory modules coupled to the fourth memory controller, wherein at least one memory module in the fourth channel can return data sought in the read request, if the data is present, to the fourth memory controller without sending the data through each memory module downstream in the fourth channel, and wherein the fourth channel contains an inverse mirror copy of data stored on the third channel.

8. The memory storage system of claim 1, further comprising a host coupled to the first and second memory controllers, wherein the host can transmit read requests to the first and second memory controllers.

9. The memory storage system of claim 8, wherein the host can compare information received from the first and second controllers in response to the read requests and determine whether the information in the first or second channels is corrupted.

10. A memory storage system, wherein the memory storage system comprises:
    a host,
    a first memory controller coupled to the host,
    a first channel of a plurality fully buffered dual in-line memory modules coupled to the first memory controller, wherein at least one first fully buffered dual in-line memory module in the first channel can return data sought in a read request, if the data is present, to the first memory controller without sending the data through each fully buffered dual in-line memory module downstream in the first channel,
    a second memory controller coupled to the host, and
    a second channel of a plurality of fully buffered dual in-line memory modules coupled to the second memory controller, wherein at least one fully buffered dual in-line memory module in the second channel can return data sought in the read request, if the data is present, to the second memory controller without sending the data through each fully buffered dual in-line memory module downstream in the second channel, and wherein the second channel contains an inverse mirror copy of data stored on the first channel.

11. The memory storage system of claim 10, wherein each fully buffered dual in-line memory module in the first channel can return data sought in the read request, if the data is present, to the first memory controller without sending the data through each fully buffered dual in-line memory module downstream in the first channel.

12. The memory storage system of claim 10, wherein each fully buffered dual in-line memory module in the second channel can return data sought in the read request, if the data is present, to the second memory controller without sending the data through each fully buffered dual in-line memory module downstream in the second channel.

13. The memory storage system of claim 10, wherein each fully buffered dual in-line memory module in the first channel, except the fully buffered dual in-line memory module in the first channel farthest from the first memory controller, can return data sought in the read request, if the data is present, to the first memory controller without sending the data through each fully buffered dual in-line memory module downstream in the first channel.

14. The memory storage system of claim 10, wherein each fully buffered dual in-line memory module in the second channel, except the fully buffered dual in-line memory module in the second channel farthest from the second memory controller, can return data sought in the read request, if the data is present, to the second memory controller without sending the data through each fully buffered dual in-line memory module downstream in the second channel.

15. The memory storage system of claim 10, wherein the first and second memory controllers can transmit information received from the first and second channels in response to the read request to the host.

16. The memory storage system of claim 15, wherein the host can compare information received from the first and second controllers and determines whether the information in the first or second channels is corrupted.

17. A method for enhancing read performance of a memory storage system including first channel of a plurality of fully buffered dual in-line memory modules coupled to a first memory controller and a second channel of a plurality of fully buffered dual in-line memory modules coupled to a second memory controller, wherein the second channel stores an inverse mirror copy of data stored in the first channel, comprising the steps of:
    transmitting a read request in parallel from the first memory controller to a first fully buffered dual in-line memory module in the first channel and from the second memory controller to a first fully buffered in-line memory module in the at second channel,
    for each of the first and second channels:
    determining whether information sought by the read request is available in the first fully buffered dual in-line memory module,
    returning the information, if found, to the memory controller coupled to the first fully buffered dual in-line memory module containing the information without sending the information to a second fully buffered dual in-line memory module in that channel, and
    sending the read request to the second fully buffered in-line memory module in that channel, if the information is not found in the first fully buffered dual in-line memory module in that channel.

18. The method of claim 17, further comprising the step of:
    determining whether information sought by the read request is available in the second fully buffered dual in-line memory module in either channel,
    returning the information, if found, to the memory controller coupled to the fully buffered dual in-line memory module containing the information without sending the information through each fully buffered dual in-line memory module downstream in the channel, and
    sending the read request to successive additional fully buffered dual in-line memory modules in the channel, if the information is not found in the second fully buffered dual in-line memory module of that channel, until the information is found.

19. The method of claim 17, further comprising the step of comparing the information received from the first memory controller with the information received from the second memory controller in response to the read request to determine whether the information sought is corrupted.

20. The method of claim 18, further comprising the step of stopping use of the information received from the first and second memory controllers if the information is corrupted.

* * * * *